United States Patent
Hayama et al.

(10) Patent No.: US 8,185,270 B2
(45) Date of Patent: May 22, 2012

(54) VEHICLE STEERING DEVICE

(75) Inventors: Ryouhei Hayama, Nabari (JP); Kenji Higashi, Tenri (JP); Shingo Maeda, Kashiwara (JP)

(73) Assignee: Jtekt Corporation, Osaka (JP)

( * ) Notice: Subject to any disclaimer, the term of this patent is extended or adjusted under 35 U.S.C. 154(b) by 464 days.

(21) Appl. No.: 12/515,278

(22) PCT Filed: Nov. 6, 2007

(86) PCT No.: PCT/JP2007/071549
§ 371 (c)(1),
(2), (4) Date: May 15, 2009

(87) PCT Pub. No.: WO2008/059731
PCT Pub. Date: May 22, 2008

(65) Prior Publication Data
US 2010/0057301 A1    Mar. 4, 2010

(30) Foreign Application Priority Data

Nov. 17, 2006 (JP) .................................. 2006-311739

(51) Int. Cl.
*B62D 5/04* (2006.01)
(52) U.S. Cl. ........ 701/43; 701/29.2; 701/34.4; 180/402; 180/444
(58) Field of Classification Search .................. None
See application file for complete search history.

(56) References Cited

U.S. PATENT DOCUMENTS

| | | | |
|---|---|---|---|
| 7,007,769 B2 * | 3/2006 | Hara et al. | 180/402 |
| 2004/0238258 A1 * | 12/2004 | Ono et al. | 180/402 |
| 2005/0072621 A1 * | 4/2005 | Hara et al. | 180/444 |
| 2006/0169519 A1 | 8/2006 | Osonoi et al. | |
| 2007/0221434 A1 * | 9/2007 | Chino et al. | 180/402 |

FOREIGN PATENT DOCUMENTS

| | | |
|---|---|---|
| JP | 10-129512 | 5/1998 |
| JP | 2002-225733 | 8/2002 |
| JP | 2006-182302 | 7/2006 |
| JP | 2006-273051 | 10/2006 |
| JP | 2006-290135 | 10/2006 |
| JP | 2006-290136 | 10/2006 |
| JP | 2007-062466 | 3/2007 |

* cited by examiner

*Primary Examiner* — Michael J. Zanelli
(74) *Attorney, Agent, or Firm* — Rabin & Berdo, PC

(57) ABSTRACT

A vehicle steering device (1) has a steering actuator (14) for steerable wheels (5) to be steered according to operation of a steering member (2), a transmission mechanism (18) including cables (22, 23), a connection mechanism (19) for allowing and interrupting mechanical connection between the steering member (2) and the wheels (5), and control unit (9). When the steering actuator (14) is normal, the control unit (9) causes the connection mechanism (19) to release mechanical connection between the steering member (2) and the wheels (5) and drives and controls the steering actuator (14) according to operation of the steering member (2). The control unit (9) includes a fail detecting section (29) for detecting, when the steering actuator (14) is normal, a fail of the transmission mechanism (18) based on a load on the steering actuator (14).

12 Claims, 7 Drawing Sheets

VEHICLE STEERING DEVICE

FIELD OF THE INVENTION

The present invention relates to a vehicle steering device.

DESCRIPTION OF RELATED ART

There is a vehicle steering device of the Steer-By-Wire type in which the steering wheel and the steerable wheels are not mechanically connected to each other. In such a vehicle steering device, a fail-safe means is required because the steering wheel and the steerable wheels are not mechanically connected to each other.

For example, the vehicle steering device of the Steer-By-Wire type discussed in Patent Document 1 is arranged such that in case of fail incidence, the steering wheel and the steerable wheels are mechanically connected to each other through a connecting means, a transmission mechanism including a pair of transmission cables, and the like.

Each of the transmission cables includes an outer tube and an inner cable movable therein. In case a fail occurs in the vehicle steering device, the rotation of the steering wheel is transmitted to the steerable wheels through the inner cables. Further, while the vehicle steering device is normal, the inner cables are moved, as driven by the steering wheel or the steering mechanism, in the outer tubes. Patent Document 1: Japanese Laid-Open Patent Application

DISCLOSURE OF THE INVENTION

Problems to be Solved by the Invention

In the vehicle steering device discussed in Patent Document 1, however, there are instances where friction due to the relative movements of the outer tubes and the inner cables, causes the inner cables to be damaged or worn when the vehicle steering device is used for a long period of time. When an inner cable is damaged, there is a likelihood that the rotation of the steering wheel is not securely transmitted to the steerable wheels in case a fail occurs in the vehicle steering device. More specifically, the fail-safe reliability is not sufficient.

In view of the foregoing, it is an object of the present invention to provide a vehicle steering device of the Steer-By-Wire type high in fail-safe reliability.

Means to Solve the Problem

To achieve the object mentioned above, a preferred embodiment of the present invention provides a vehicle steering device comprising: a steering actuator for steering the steerable wheels according to the operation of a steering member; a transmission mechanism including an input member, an output member always connected to the steerable wheels and a cable which connects the input member and the output member to each other; a connection mechanism capable of switching between a first state of connecting the steering member and the input member to each other, and a second state of disconnecting the steering member and the input member from each other; and a control unit arranged to control the steering actuator and the connection mechanism, wherein the control unit is arranged such that while the steering actuator is normal, the connection mechanism is brought to the second state and the steering actuator is drivingly controlled according to the operation of the steering member, and the control unit is also arranged such that when a fail occurs in the steering actuator, the connection mechanism is brought to the first state where the steering member and the steerable wheels are mechanically connected to each other, and the steering actuator is stopped from being drivingly controlled, and the control unit includes a fail detecting portion arranged to detect, based on the load of the steering actuator, a fail in the transmission mechanism while the steering actuator is normal.

According to the embodiment above-mentioned, the control unit is so arranged as to detect a fail in the transmission mechanism (cable damages or the like) based on the load of the steering actuator. The detection of a fail in the transmission mechanism is conducted while the steering actuator is in a normal state. This prevents an abnormal cable from being used when a fail occurs in the steering actuator. Accordingly, even though a fail occurs in the steering actuator, the movement of the steering member can securely be transmitted to the steerable wheels by the transmission mechanism. This improves fail-safe reliability.

BEST MODES FOR CARRYING OUT THE INVENTION

Referring to the attached drawings, the description will discuss preferred embodiments of the present invention.

Figure 1:
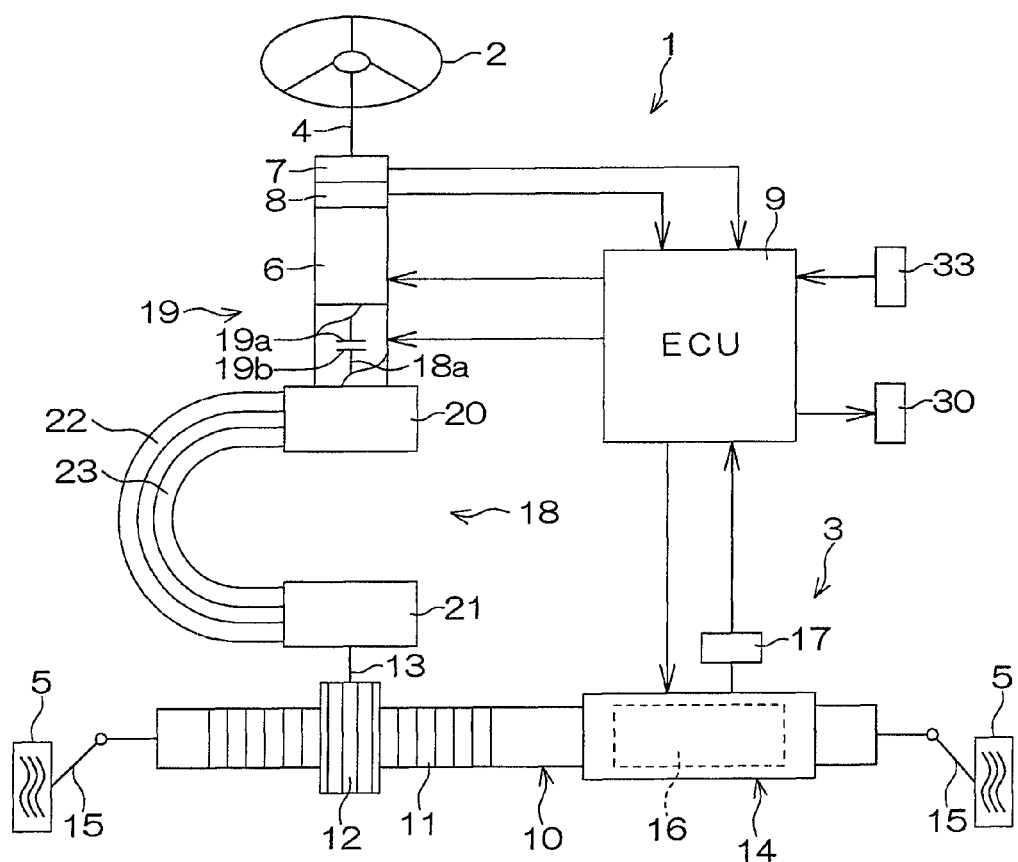
FIG. 1 is a schematic diagram illustrating the arrangement of a vehicle steering device according to an embodiment of the present invention.

FIG. 1 is a schematic diagram illustrating the arrangement of a vehicle steering device 1 according to an embodiment of the present invention.

In FIG. 1, the vehicle steering device 1 according to the embodiment of the present invention is of the Steer-By-Wire type in which the steering member and the steerable wheels are not mechanically connected to each other, and has a steering wheel 2 as a steering member and a steering mechanism 3 including a rack-and-pinion mechanism.

The steering wheel 2 is connected to one end of a steering shaft 4 rotatably supported by the vehicle body (not shown). Coaxially connected to an intermediate part of the steering shaft 4 is a reaction force electric motor 6 arranged to give a steering reaction force to the steering wheel 2.

Further disposed along the steering shaft 4 between the electric motor 6 and the steering wheel 2 are: a steering angle sensor 7 for detecting the steering direction and steering angle of the steering wheel 2; and a torque sensor 8 for detecting the steering torque applied to the steering wheel 2 by the driver. The values detected respectively by the steering angle sensor 7 and the torque sensor 8, are entered into an ECU 9 (Electronic Control Unit) serving as a control unit.

The steering mechanism 3 comprises: a rack shaft 10 serving as a steering shaft extending in the lateral direction of the vehicle; a pinion 12 meshed with racks 11 formed on the rack shaft 10; a pinion shaft 13 serving as an output member and having one end to which the pinion 12 is connected; and a steering actuator 14 coaxially connected to the rack shaft 10 and arranged to give a steering force thereto. The pinion shaft 13 is always connected to the steerable wheels 5 through the rack shaft 10 and the like.

The rack shaft 10 is axially movably supported in a housing (not shown) fixed to the vehicle body. Each end of the rack shaft 10 is connected to a tie rod 15. Each tie rod 15 is connected to each of the steerable wheels 5 through a knuckle arm (not shown).

The steering actuator 14 includes an electric motor 16 and a conversion mechanism (not shown) such as a ball screw mechanism or the like for converting the rotation of the rotary shaft of the electric motor 16 into an axial movement of the rack shaft 10.

When the steering wheel 2 is steered (rotated), the steering angle and steering torque thereof are respectively detected by the steering angle sensor 7 and the torque sensor 8. Based on the steering angle entered from the steering angle sensor 7 and the vehicle speed entered from a vehicle speed sensor 33, the ECU 9 determines the steering force to be applied to the rack shaft 10. According to the steering force thus determined, the ECU 9 determines the value of an electric current to be supplied to the electric motor 16, and then supplies an electric current of the value thus determined to the electric motor 16 through a driving circuit (not shown) in the ECU 9.

Accordingly, the steering force determined based on the steering angle and the like is given from the steering actuator 14 to the rack shaft 10, causing the same to be axially moved, thus enabling the steerable wheels 5 to be steered. On the other hand, the ECU 9 is arranged to supply, to the reaction force electric motor 6, an electric current having a value obtained based on the steering reaction force determined by the steering angle and the like of the steering wheel 2. Accordingly, the reaction force electric motor 6 is then driven to give, to the steering wheel 2, the steering reaction force obtained based on the steering angle and the like of the steering wheel 2.

The electric current supplied to the electric motor 16 is detected by a current detecting sensor 17. The electric current value detected by the current detecting sensor 17 is entered into the ECU 9.

Figure 2:
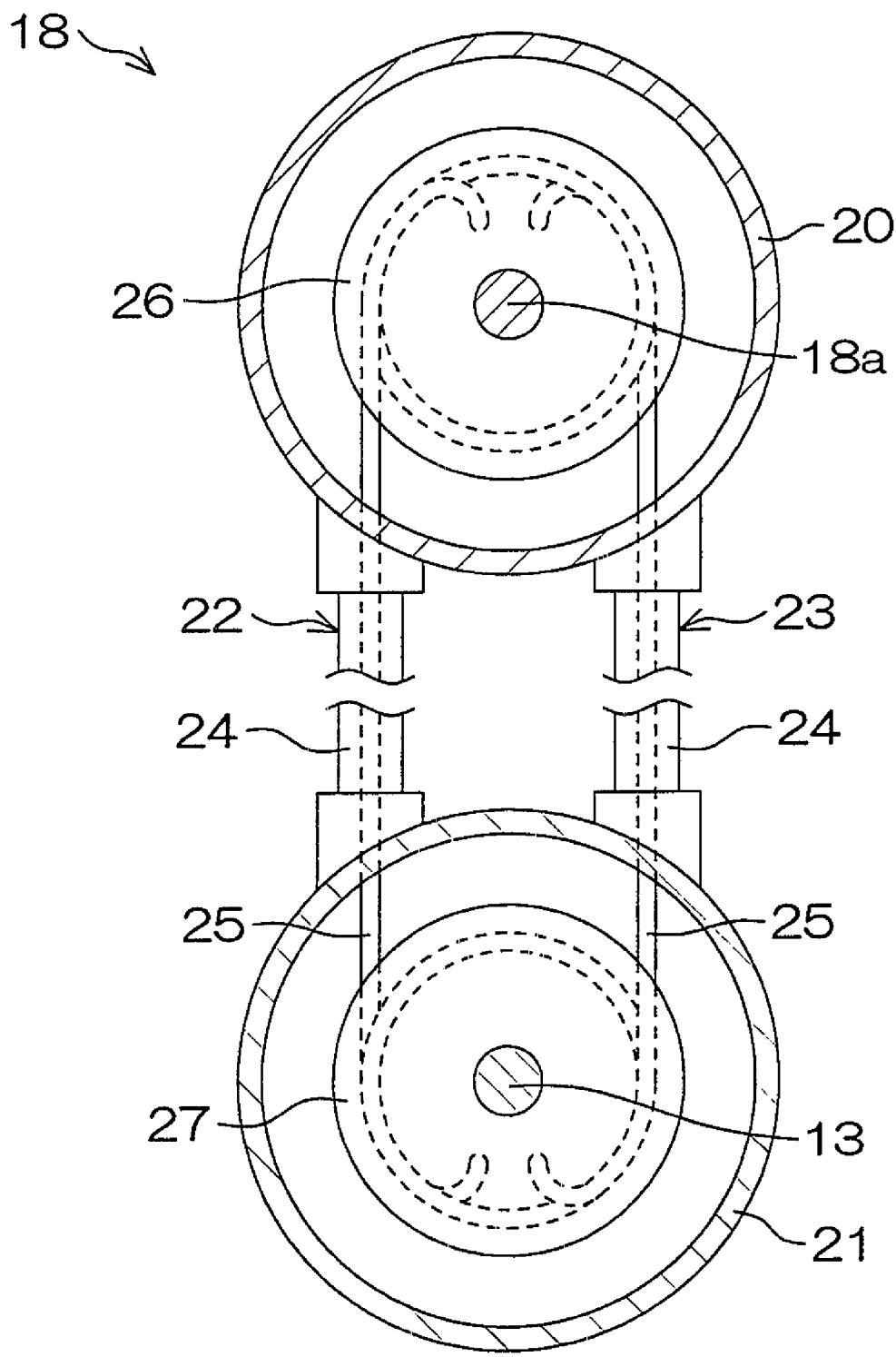
FIG. 2 is a schematic enlarged view of the main portion of the vehicle steering device in FIG. 1.

FIG. 2 is a schematic enlarged view of the main portion of the vehicle steering device 1 mentioned above. Referring to FIGS. 1 and 2, the vehicle steering device 1 has a transmission mechanism 18 and a connection mechanism 19. These mechanisms 18, 19 are arranged such that when a fail occurs in the vehicle steering device 1 (for example, when the device 1 is not functioned as a vehicle steering device of the Steer-By-Wire type due to a trouble in the steering actuator 14 or an arrangement related thereto), the steering wheel 2 and the steering mechanism 3 are mechanically connected to each other for enabling the steerable wheels 5 to be steered.

The connection mechanism 19 is connected to the steering shaft 4 at its other end (which is the end opposite to the end to which the steering wheel 2 is connected). The connection mechanism 19 can connect the steering shaft 4 to the transmission mechanism 18. Examples of the connection mechanism 19 include, an electromagnetic clutch, a friction clutch, an over-ride clutch and the like.

The connection mechanism 19 has a first member 19a and a second member 19b which are faced to each other. The first member 19a is integrally rotatably connected to the other end of the steering shaft 4. The second member 19b is integrally rotatably connected to a rotary shaft 18a which extends from the transmission mechanism 18 and which serves as an input member.

The connection mechanism 19 can switch between a first state of mechanically connecting the steering wheel 2 and the rotary shaft 18a to each other, and a second state of disconnecting the steering wheel 2 and the rotary shaft 18a from each other.

More specifically, when the ECU 9 executes a control operation to connect the first member 19a and the second member 19b to each other, the connection mechanism 19 is changed from the second state to the first state, thereby to mechanically connect the steering shaft 4 and the rotary shaft 18a to each other. This causes the steering wheel 2 and the rotary shaft 18a to be mechanically connected to each other. By mechanically connecting the steering wheel 2 and the rotary shaft 18a to each other, the rotation of the steering wheel 2 and the steering shaft 4 can be transmitted to the transmission mechanism 18. Further, when the ECU 9 disconnects the first member 19a and the second member 19b from each other, the connection mechanism 19 is changed from the first state to the second state. This disconnects the steering wheel 2 and the rotary shaft 18a from each other.

Referring to FIG. 2, the transmission mechanism 18 has a first pulley 26 rotatably held within a first casing 20, a second pulley 27 rotatably held within a second casing 21, and a pair of transmission cables 22, 23.

The first pulley 26 is integrally rotatably and coaxially connected to the rotary shaft 18a. The second pulley 27 is integrally rotatably and coaxially connected to the pinion shaft 13 at its other end (the end opposite to the end to which the pinion 12 is connected).

Each of the pair of transmission cables 22, 23 has an outer tube 24 and an inner cable 25 movably inserted therein. One end of the outer tube 24 of each of the transmission cables 22, 23 is connected to the first casing 20. The other end of the outer tube 24 of each of the transmission cables 22, 23 is connected to the second casing 21.

Further, one end of the inner cable 25 of each of the transmission cables 22, 23 is attached to the first pulley 26. The inner cable 25 of one transmission cable 22 and the inner cable 25 of the other transmission cable 23 are respectively wound on the first pulley 26 in the opposite directions.

Further, the other end of the inner cable 25 of each of the transmission cables 22, 23 is attached to the second pulley 27. The inner cable 25 of one transmission cable 22 and the inner cable 25 of the other transmission cable 23 are respectively wound on the second pulley 27 in the opposite directions.

In the state where the steering shaft 4 and the transmission mechanism 18 are not being connected to each other by the connection mechanism 19, the inner cables 25 of the transmission cables 22, 23 are driven by the rotations of the pinion shaft 13 and the second pulley 27 caused by the axial movement of the rack shaft 10, thus causing these inner cables 25 to be moved in the outer tubes 24.

More specifically, with the rotation of the second pulley 27, one of the pair of inner cables 25, 25 is reeled out from the second pulley 27, while the other is wound on the second pulley 27. Thus, the inner cables 25 of the transmission cables 22, 23 are moved within the outer tubes 24.

In the state where the steering shaft 4 and the transmission mechanism 18 are being connected to each other by the connection mechanism 19, the rotation of the steering wheel 2 is transmitted to the steering mechanism 3 through one of the pair of inner cables 25, 25.

More specifically, for example when the above-mentioned fail occurs in the vehicle steering device 1 and the ECU 9 detects the fail, the ECU 9 supplies a signal for connecting the steering shaft 4 and the transmission mechanism 18 to each other by the connection mechanism 19. This causes the steering shaft 4 and the transmission mechanism 18 to be connected to each other such that the steering wheel 2 and the steering mechanism 3 are mechanically connected to each other through the steering shaft 4, the connection mechanism 19 and the transmission mechanism 18.

Then, when the steering wheel 2 is rotated clockwise in this state, the steering shaft 4 and the first pulley 26 are rotated clockwise and one end side of the inner cable 25 of one transmission cable 22 is wound on the first pulley 26, while the other end side of this inner cable 25 is reeled out from the second pulley 27. This causes the rotation of the first pulley 26 to be transmitted to the second pulley 27. When the second pulley 27 is rotated, the pinion shaft 13 is also rotated. By the pinion 12 and the racks 11, the rotation of the pinion shaft 13 is converted into an axial movement of the rack shaft 10 extending in the lateral direction of the vehicle. This achieves the steering of the steerable wheels 5.

On the other hand, when the steering wheel 2 is rotated counterclockwise in the state where the steering wheel 2 and the steering mechanism 3 are being mechanically connected to each other by the connection mechanism 19, the steering shaft 4 and the first pulley 26 are rotated counterclockwise and the one end side of the inner cable 25 of the other transmission cable 23 is wound on the first pulley 26, while the other end side of this inner cable 25 is reeled out from the second pulley 27. This achieves the steering of the steerable wheels 5 in the direction opposite to that at the time the steering wheel 2 is rotated clockwise.

More specifically, even though the fail as mentioned above occurs in the vehicle steering device 1, the steerable wheels 5 can securely be steered by mechanically connecting the steering wheel 2 and the steering mechanism 3 to each other.

Figure 3:
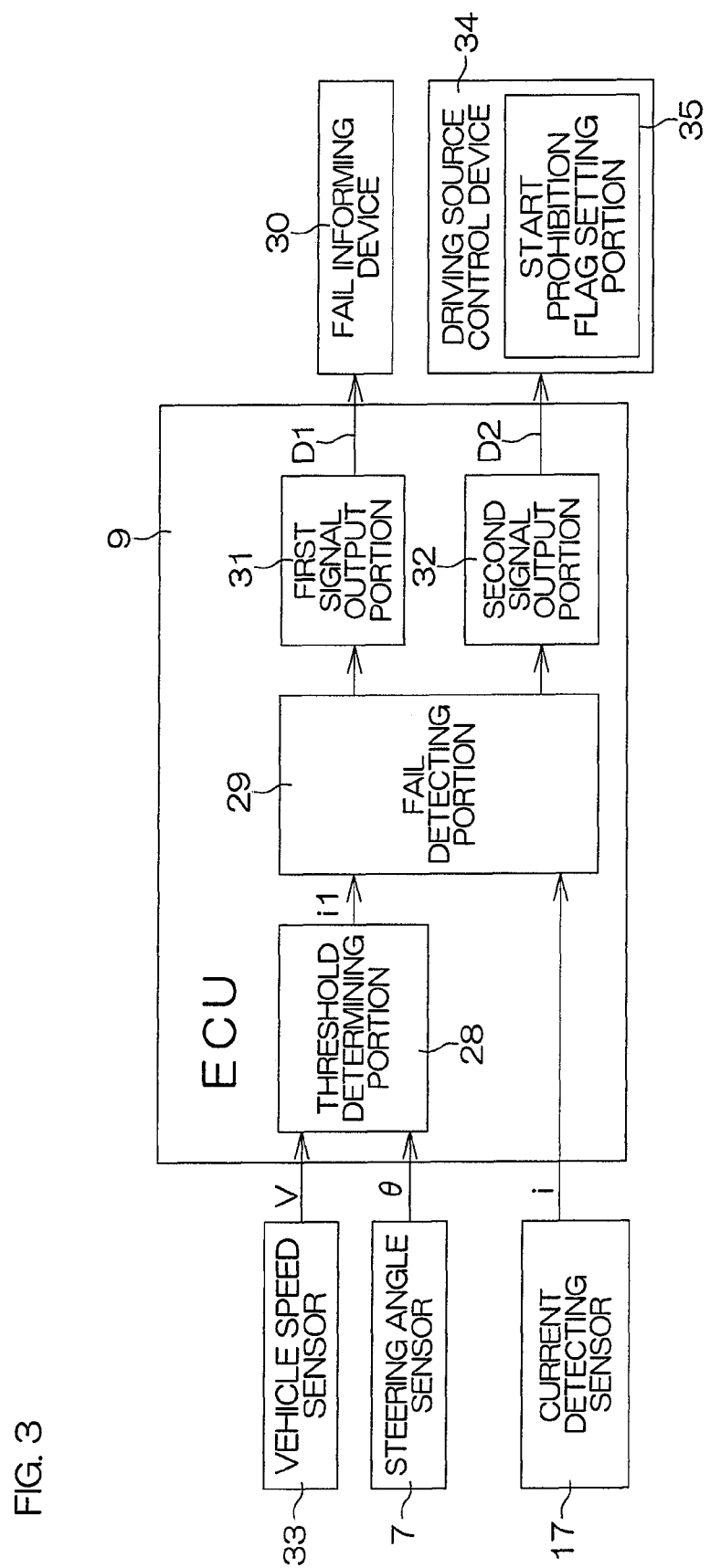
FIG. 3 is a block diagram illustrating a portion of the electric arrangement of the vehicle steering device in FIG. 1.

FIG. 3 is a block diagram illustrating a portion of the electric arrangement of the vehicle steering device 1.

Referring to FIGS. 1 and 3, this embodiment is characterized in that while the fail above-mentioned is not being observed in the vehicle steering device 1, a fail in the transmission mechanism 18 can be detected by comparing the motor 16 electric current value detected by the current detecting sensor 17 with the electric current threshold obtained based on the vehicle speed and the steering angle. The ECU 9 has a threshold determining portion 28, a fail detecting portion 29, a first signal output portion 31 and a second signal output portion 32.

The threshold determining portion 28 has a function of selecting, based on a vehicle speed V entered from the vehicle speed sensor 33, a map previously stored in the ECU 9, thereby to obtain a motor electric current threshold i1 based on the map thus selected and a steering angle θ entered from the steering angle sensor 7.

The fail detecting portion 29 is arranged such that when no fail occurs for example in the steering actuator 14, a fail in the transmission mechanism 18 can be detected based on both the motor electric current threshold i1 entered from the threshold determining portion 28 and the motor electric current i entered from the current detecting sensor 17. For example, when a fail has been detected in the transmission mechanism 18, the fail detecting portion 29 supplies a fail detecting signal to the first signal output portion 31 and the second signal output portion 32.

The first signal output portion 31 has a function of supplying, based on the input of a fail detecting signal from the fail detecting portion 29, a signal D1 (fail informing signal D1) for informing a fail to a fail informing device 30. The fail informing device 30 informs a fail in response to the input of a fail informing signal D1 from the first signal output portion 31. The fail informing device 30 is arranged to inform the driver of a fail in the transmission mechanism 18 for example by means of a buzzer or by lighting a fail informing lamp.

The second signal output portion 32 has a function of supplying, in response to the input of a fail detecting signal from the fail detecting portion 29, a signal D2 (fail informing signal D2) for informing a fail to a driving source control device 34 which controls a vehicle driving source such as an engine, a motor or the like. The driving source control device 34 has a start prohibition flag setting portion 35 capable of setting a start prohibition flag for prohibiting the driving source from being started. The start prohibition flag setting portion 35 sets a start prohibition flag in response to the input of a fail informing signal D2 from the second signal output portion 32.

Figure 4:
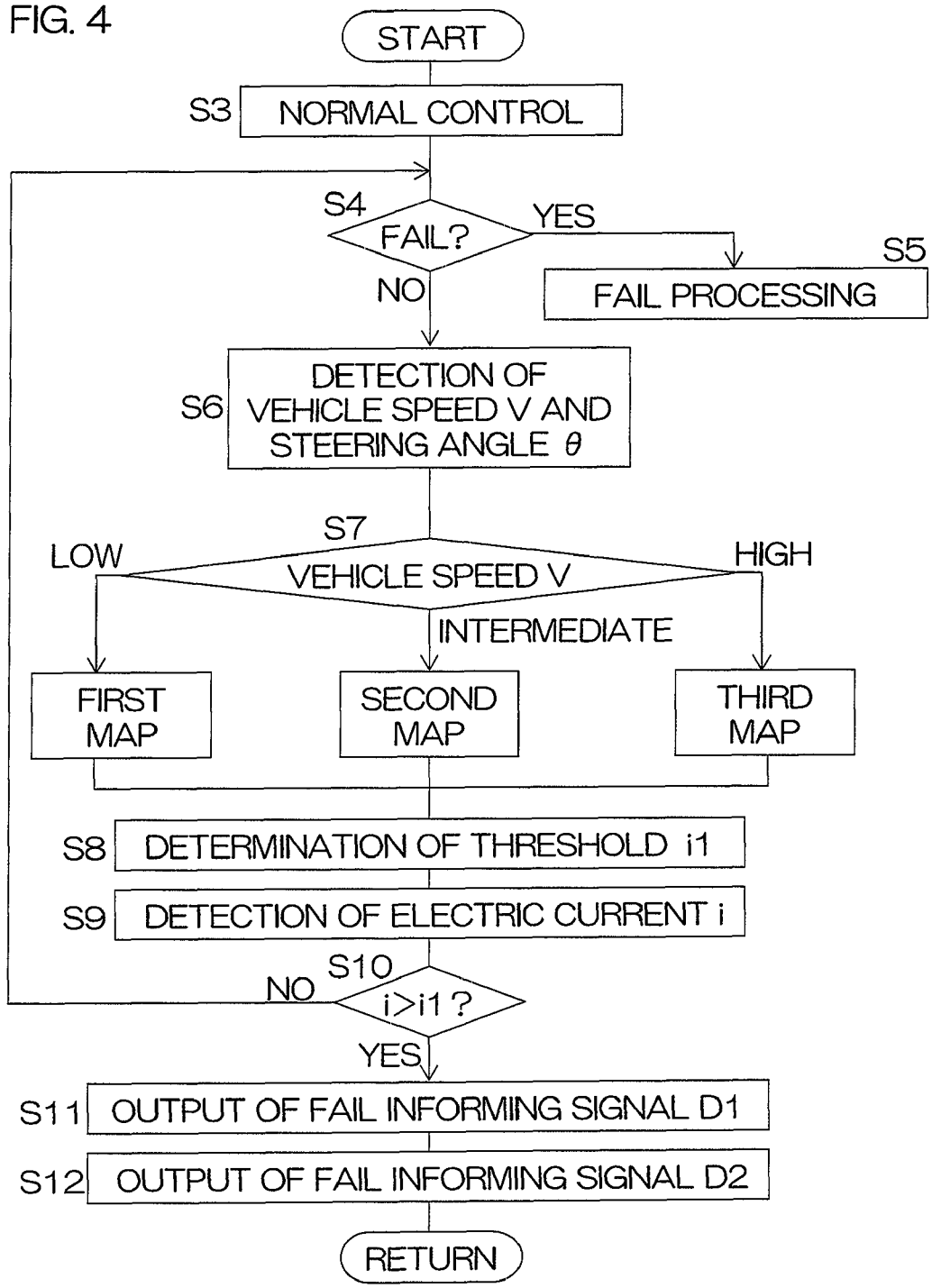
FIG. 4 is a flow chart illustrating a flow of judging a fail in the transmission mechanism of the vehicle steering device in FIG. 1.
Figure 5:
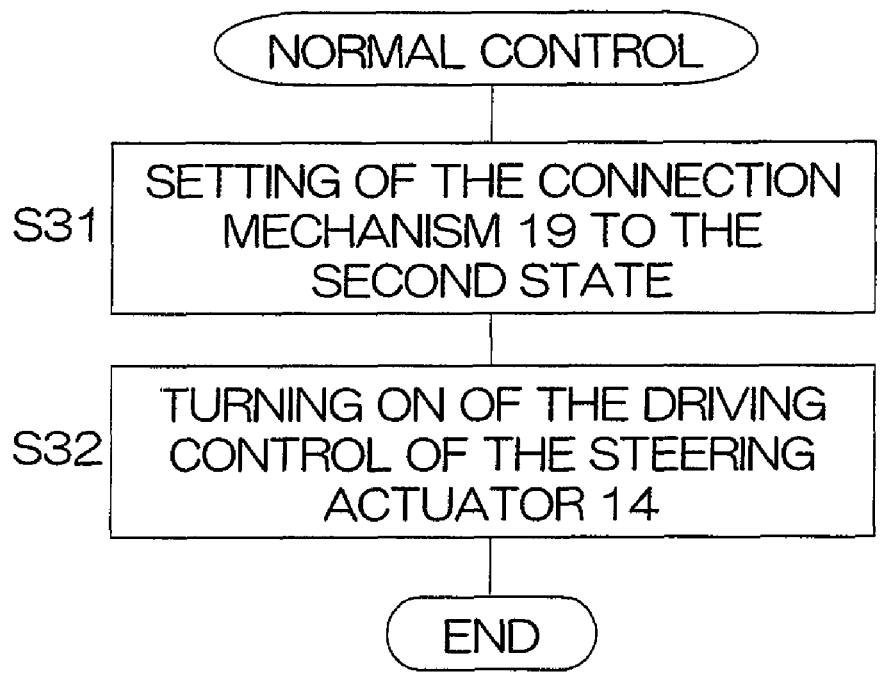
FIG. 5 is a flow chart illustrating a flow of a normal control of the vehicle steering device in FIG. 1.
Figure 6:
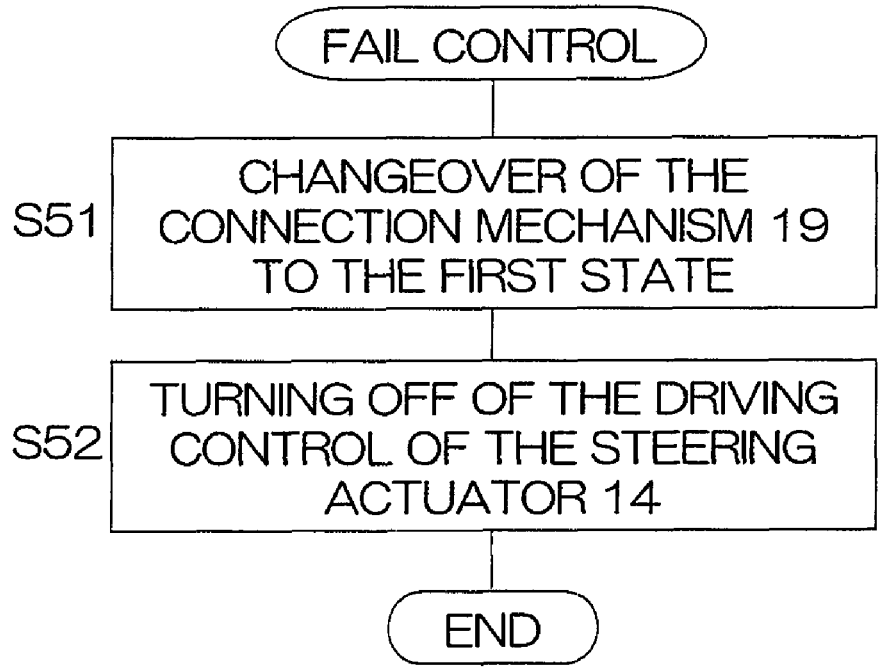
FIG. 6 is a flow chart illustrating a flow of a fail control of the vehicle steering device in FIG. 1.

FIG. 4 is a flow chart illustrating a flow of judging a fail in the transmission mechanism 18 of the vehicle steering device 1. FIG. 5 is a flow chart illustrating a flow of a normal control of the vehicle steering device 1. FIG. 6 is a flow chart illustrating a flow of a fail control of the vehicle steering device 1.

Figure 7:
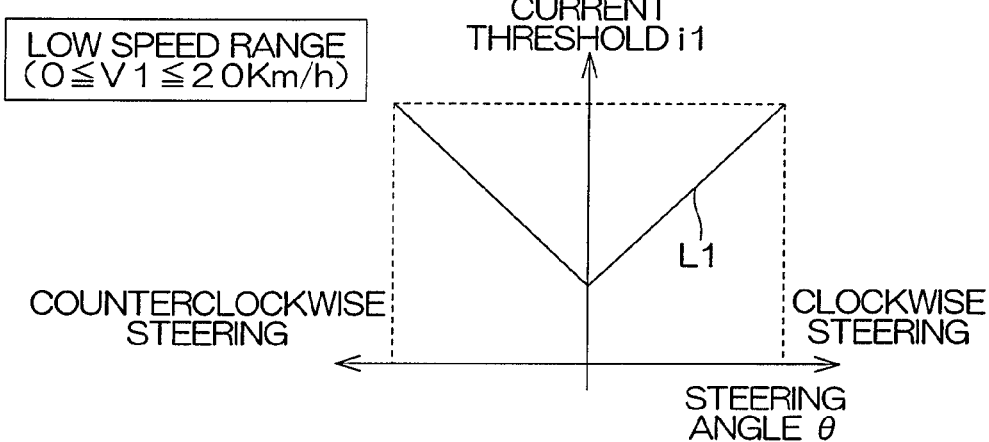
FIG. 7 is a first map for obtaining a threshold of a motor electric current at the time of low vehicle speed.
Figure 8:
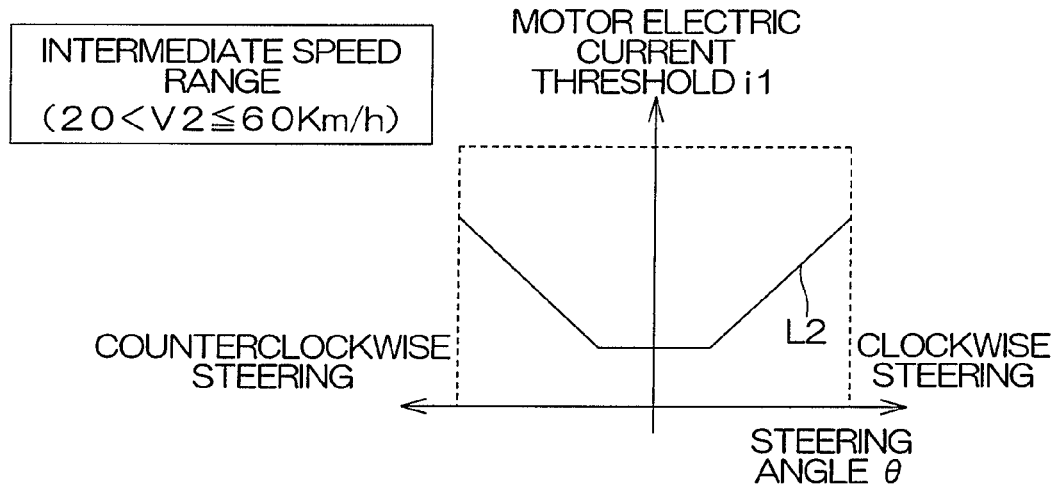
FIG. 8 is a second map for obtaining a threshold of a motor electric current at the time of intermediate vehicle speed.
Figure 9:
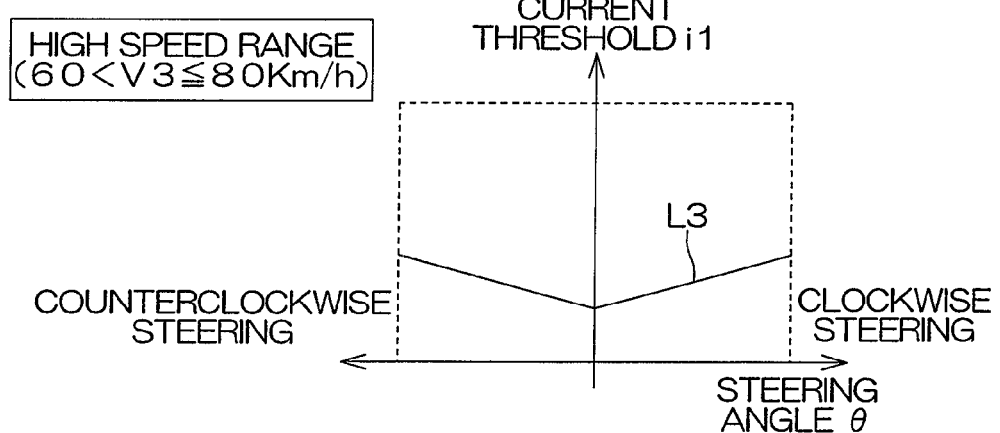
FIG. 9 is a third map for obtaining a threshold of a motor electric current at the time of high vehicle speed.

FIG. 7 is a first map for obtaining a threshold i1 of a motor electric current at the time of low vehicle speed. FIG. 8 is a second map for obtaining a threshold i1 of a motor electric current at the time of intermediate vehicle speed. FIG. 9 is a third map for obtaining a threshold i1 of a motor electric current at the time of high vehicle speed.

Referring to FIG. 4, when the ignition key is turned on, the ECU 9 is started. After the start, the ECU 9 executes a processing of detecting a fail in the vehicle steering device 1. When no fail has been detected, the ECU 9 executes a normal control of the vehicle steering device 1 (Step S3).

According to the normal control, as shown in FIG. 5, the ECU 9 controls the connection mechanism 19, causing the same to be set to the second state (Step S31). This provides a state where the steering wheel 2 serving as the steering member is mechanically disconnected from the rotary shaft 18a serving as the input member.

Then, while the connection mechanism 19 is being held in the second state, the ECU 9 drives the steering actuator 14 according to the operation of the steering wheel 2 (Step S32). More specifically, the steering force based on the steering angle and the like is given to the rack shaft 10 from the steering actuator 14, thus achieving the steering of the steerable wheels 5.

Referring to FIG. 4, the ECU 9 executes, at a predetermined cycle in the normal control processing, a processing of detecting a fail in the vehicle steering device 1 (Step S4). If a fail is detected (Yes), a fail processing is executed (Step S5).

According to the fail processing, the ECU 9 controls the connection mechanism 19, causing the same to be changed in state to the first state (Step S51) as shown in FIG. 6. This causes the steering wheel 2 and the rotary shaft 18a to be mechanically connected to each other.

Then, the ECU 9 stops driving the steering actuator 14 while the connection mechanism 19 is being held in the first state (Step S52). More specifically, the rotation of the steering wheel 2 is transmitted to the steering mechanism 3 through one of the pair of inner cables 25, 25 as mentioned earlier.

On the other hand, when no fail has been detected (No), the vehicle speed V is detected by the vehicle speed sensor 33 and the steering angle θ is detected by the steering angle sensor 7 (Step S6), as shown in FIG. 4. Then, the ECU 9 selects a map corresponding to the entered vehicle speed V (Step S7).

More specifically, when the vehicle speed V is in a low speed range which satisfies, for example, $0 \leqq V \leqq 20$ Km/h, the first map shown in FIG. 7 is selected. Further, when the vehicle speed V is in an intermediate speed range which satisfies, for example, $20 \leqq V \leqq 60$ Km/h, the second map shown in FIG. 8 is selected. Further, when the vehicle speed V is in a high speed range which satisfies, for example, $60 < V \leqq 80$ Km/h, the third map shown in FIG. 9 is selected.

When a map is selected for determining a motor electric current threshold i1, the ECU 9 determines a motor electric current threshold i1 based on the map thus selected and the entered steering angle θ (Step S8). More specifically, the lines L1, L2, L3 respectively shown in FIGS. 7, 8, 9 show the motor electric current threshold lines for the steering angle θ in each vehicle speed range. The value on the line L1, L2, L3 corresponding to the entered vehicle speed V and steering angle θ, represents the motor electric current threshold i1 corresponding to the entered vehicle speed V and steering angle θ.

When the motor electric current threshold i1 is determined, the electric current i of the electric motor 16 is then detected by the current detecting sensor 17 (Step S9), and the value of the electric current i thus detected is entered into the ECU 9. Then, a judgment is made whether or not the motor electric current i thus entered is greater than the motor electric current threshold i1 determined at the Step S8 (Step S10).

When the entered motor electric current i is equal to or smaller than the threshold i1 (No), the sequence is returned to the Step S4 where the ECU 9 executes, at a predetermined cycle, a processing of detecting a fail in the vehicle steering device 1. On the other hand, when the entered motor electric current i is greater than the threshold i1 (Yes), that is, when a fail has been detected in the transmission mechanism 18, the ECU 9 supplies a fail informing signal D1 to the fail informing device 30 (Step S11). Further, the ECU 9 supplies a fail informing signal D2 to the driving source control device 34 (Step S12).

In response to the input of the fail informing signal D1 from the ECU 9, the fail informing device 30 informs the driver of a fail in the transmission mechanism 18. This urges the driver to restore the transmission mechanism 18 to a normal state. Further, in response to the input of the fail informing signal D2 from the ECU 9, the driving source control device 34 sets a start prohibition flag for prohibiting the vehicle driving source such as the engine, the motor or the like from being started.

Figure 10:
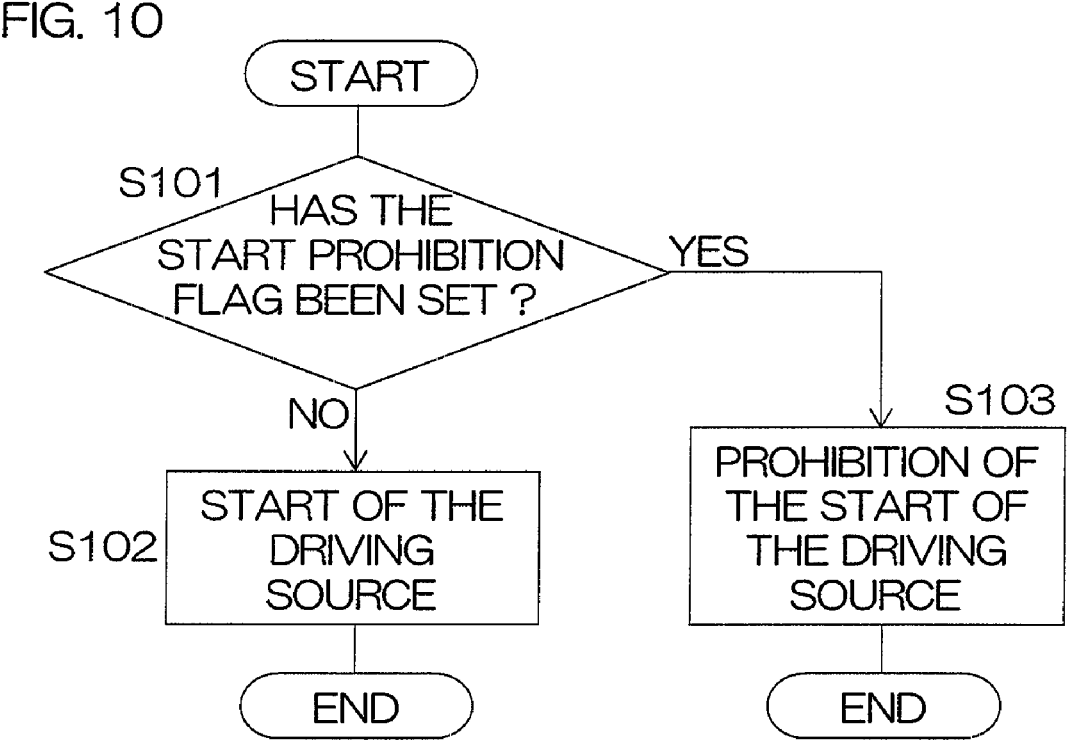
FIG. 10 is a flow chart illustrating a flow of controlling a driving source by a driving source control device.

FIG. 10 is a flow chart illustrating a flow of controlling the driving source by the driving source control device 34.

Referring to FIGS. 3 and 10, when the ignition key is turned on, the driving source control device 34 is started. After the start, the driving source control device 34 makes sure whether or not a start prohibition flag is set (Step S101).

When the driver conducts an operation of starting the vehicle driving source at the time the start prohibition flag has not been set (No), the driving source control device 34 starts the driving source (Step S102).

On the other hand, when the driver conducts an operation of starting the vehicle driving source at the time the start prohibition flag is being set (Yes), the driving source control device 34 prohibits the driving source from being started (Step S103). This forcibly urges the driver to repair the vehicle to securely prevent the fail in the transmission mechanism 18 from being left as it is.

According to the embodiment as mentioned above, the following functions and advantages are obtained. That is, a fail in the transmission mechanism 18 can be detected by judging whether or not the motor electric current i detected by the current detecting sensor 17 is greater than a predetermined threshold i1.

When the vehicle steering device 1 is used for a long period of time, the inner cables 25 are damaged or become worn due to friction caused by the relative movements of the inner cables 25 and the outer tubes 24. If the inner cables 25 are damaged, this increases the transfer resistance of the inner cables 25 in the outer tubes 24. When the inner cables 25 are increased in transfer resistance, the resistance is applied to the axial movement of the rack shaft 10. Accordingly, a steering force greater than that required at a normal time is required for a constant steering amount. More specifically, since the load of the steering actuator 14 is increased, a larger electric current is supplied to the electric motor 16 of the steering actuator 14. Accordingly, as done in this embodiment, a fail in the transmission mechanism 18 (damages of the transmission cables 22, 23 or the like) can be detected based on the load of the steering actuator 14 by comparing the motor electric current i with a predetermined threshold i1.

It is noted that this fail detection of the transmission mechanism 18 is conducted at the time the vehicle steering device 1 is in a normal state. Further, when a fail is detected in the transmission mechanism 18, the driver is urged to repair the fail. This prevents the damaged transmission cables 22, 23 from being used when the vehicle is steered with the steering wheel 2 and the steering mechanism 3 mechanically connected to each other. That is, fail-safe reliability is improved.

The present invention should not be limited to the embodiment as mentioned above, but may be modified in any of different manners. In the embodiment mentioned above, for example, the description has been made of the arrangement where the ECU 9 supplies both fail informing signals D1 and D2 when a fail has been detected in the transmission mechanism 18. However, the ECU 9 may supply either one of the fail informing signals D1 and D2.

In the foregoing, the present invention has been discussed in detail with reference to the specific examples. However, those skilled in the art may readily conceive their variations, modifications and equivalents. Accordingly, it should be noted that the spirit and scope of the present invention are limited only by the appended claims, and therefore encompass the equivalent thereof.

This application corresponds to Japanese Patent Application Number 2006-311739 filed on 17 Nov. 2006 with the Japanese Patent Office, the entire disclosure of which is incorporated herein by reference.

What we claim is:

1. A vehicle steering device, comprising:
   a steering actuator for steering steerable wheels according to an operation of a steering member;
   a transmission mechanism including an input member, an output member always connected to the steerable wheels, and a cable that connects the input member and the output member to each other;
   a connection mechanism configured to switch between a first state of connecting the steering member and the input member to each other, and a second state of disconnecting the steering member and the input member from each other; and
   a control unit arranged to control the steering actuator and the connection mechanism,
   the control unit being arranged such that while the steering actuator is normal, the connection mechanism is brought to the second state and the steering actuator is drivingly controlled according to the operation of the steering member, the control unit being arranged such that when a fail occurs in the steering actuator, the connection mechanism is brought to the first state in which the steering member and steerable wheels are mechanically connected to each other and the steering actuator is stopped from being drivingly controlled, and the control unit including a fail detecting portion arranged to detect, based on a load of the steering actuator, a fail in the transmission mechanism while the steering actuator is normal with the connection mechanism being in the second state.

2. A vehicle steering device according to claim 1, wherein the steering actuator includes an electric motor;

the vehicle steering device further comprises an electric current sensor configured to detect an electric current of the electric motor; and the fail detecting portion is arranged to detect a fail in the transmission mechanism based on a comparison of the electric current value detected by the electric current sensor with a threshold.

3. A vehicle steering device according to claim 2, further comprising:

a vehicle speed detecting sensor to detect a vehicle traveling speed; and a steering angle detecting sensor for detecting a steering angle of the steering member, wherein the control unit includes a threshold setting portion arranged to set the threshold based on both the vehicle speed detected by the vehicle speed detecting sensor and the steering angle detected by the steering angle detecting sensor.

4. A vehicle steering device according to claim 3, wherein the cable includes a tubular outer tube and an inner cable movable therein.

5. A vehicle steering device according to claim 2, wherein the cable includes a tubular outer tube and an inner cable movable therein.

6. A vehicle steering device according to claim 1, wherein the control unit includes a signal output portion arranged to supply a signal when a fail is detected by the fail detecting portion.

7. A vehicle steering device according to claim 6, wherein a signal supplied from the signal output portion includes a signal for informing a fail to a fail informing device.

8. A vehicle steering device according to claim 7, wherein the cable includes a tubular outer tube and an inner cable movable therein.

9. A vehicle steering device according to claim 6, wherein a signal supplied from the signal output portion includes a signal for prohibiting a drive source from being started.

10. A vehicle steering device according to claim 9, wherein the cable includes a tubular outer tube and an inner cable movable therein.

11. A vehicle steering device according to claim 6, wherein the cable includes a tubular outer tube and an inner cable movable therein.

12. A vehicle steering device according to claim 1, wherein the cable includes a tubular outer tube and an inner cable movable therein.

* * * * *